United States Patent [19]

Stephens

[11] Patent Number: 5,333,226
[45] Date of Patent: Jul. 26, 1994

[54] FIBER OPTIC SCULPTURAL ART AND METHOD OF MAKING SAME

[76] Inventor: Gregg Stephens, 6508 Coldwater Canyon #5, North Hollywood, Calif. 91606

[21] Appl. No.: 853,979

[22] Filed: Mar. 23, 1992

[51] Int. Cl.⁵ .............................................. G02B 6/44
[52] U.S. Cl. ................................ 385/100; 385/115; 385/901
[58] Field of Search ............... 385/100, 101, 102, 103, 385/107, 106, 137, 115, 901

[56] References Cited

U.S. PATENT DOCUMENTS

| | | | |
|---|---|---|---|
| 3,749,901 | 7/1973 | Clough | 385/137 X |
| 3,758,771 | 9/1973 | Frohardt et al. | 385/115 X |
| 3,766,376 | 10/1973 | Sadacca et al. | 385/115 X |
| 3,803,398 | 4/1974 | Walker | 385/115 X |
| 4,278,835 | 7/1981 | Jackson | 385/101 X |
| 4,557,560 | 12/1985 | Bohannon, Jr. et al. | 385/107 |
| 4,717,235 | 1/1988 | Kitagawa et al. | 385/101 X |
| 4,895,426 | 1/1990 | Pinson | 385/101 |
| 5,119,457 | 6/1992 | Callahan | 385/100 X |

*Primary Examiner*—John D. Lee
*Assistant Examiner*—Phan T. Heartney
*Attorney, Agent, or Firm*—Benman, Collins & Sawyer

[57] ABSTRACT

A flexible, self-supporting fiber optic cable. The inventive cable includes a plurality of optical fibers and a plurality of strands of metallic wire coextensive with the optical fiber along the longitudinal axes thereof. The cable is particularly well-suited for aesthetic sculptural illuminated applications including fiber optic trees. The fiber optic trees include a self-supporting fiber optic cable including multiple strands of optic fiber which is twisted along the length thereof. The twist is effective to: 1) cause light to escape from the fiber along the length thereof and 2) create the appearance of a branch or other supporting member of a plant or tree. The optical fibers are supported by strands of wire coextensive therewith. When light is input to the fibers, an aesthetically pleasing illuminated optical sculpture in the shape of a tree is created.

5 Claims, 1 Drawing Sheet

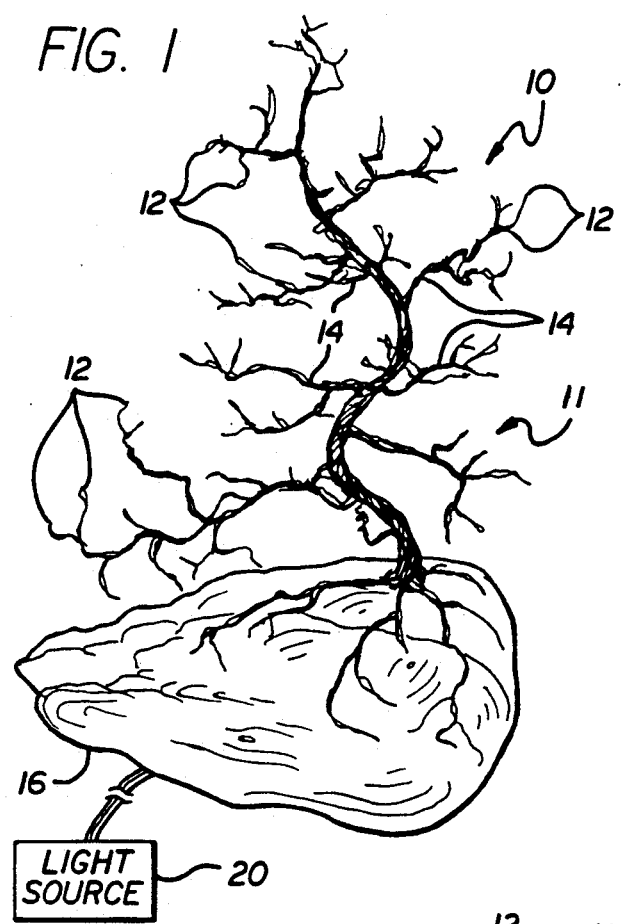
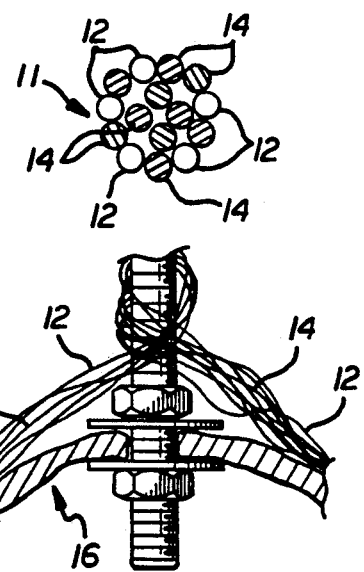
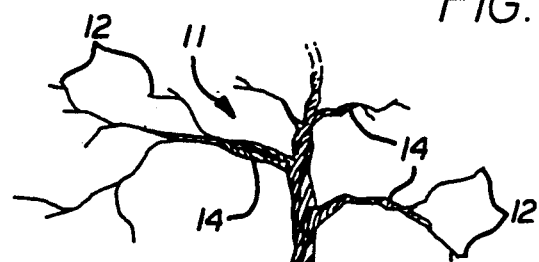
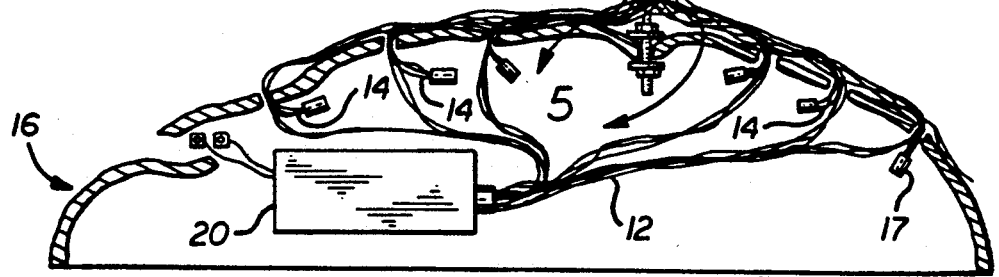
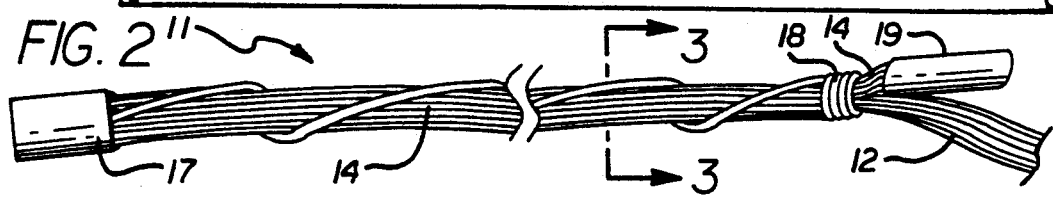

FIBER OPTIC SCULPTURAL ART AND METHOD OF MAKING SAME

BACKGROUND OF THE INVENTION

1. Field of the Invention

The present invention relates to fiber optic illumination. More specifically, the present invention relates to aesthetic fiber optic illumination systems and methods of constructing same.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Optical fibers are widely used for communication and illumination applications. An optical fiber is a thin strand of flexible, transparent light conducting material such as acrylic. Optical fibers typically consist of a core material surrounded by cladding and occasionally a protective sheath.

In a typical optical fiber illumination system, the output of the fiber is provided at the end thereof. However, it has been recognized that compelling visual effects may be created when the output of the fiber is provided along the length thereof.

However, the flexibility of the fiber, an asset in many applications, presents support problems in an aesthetic lengthwise illumination application. Thus, there is a need in the art for a method and apparatus for supporting an optical fiber by which the flexibility and luminescence of the fiber are assisted.

SUMMARY OF THE INVENTION

The need in the art is addressed by the present invention which provides a flexible, self-supporting fiber optic cable. The inventive cable includes a plurality of optical fibers and a plurality of strands of metallic wire coextensive with the optical fibers along the longitudinal axes thereof. The cable is particularly well-suited for aesthetic sculptural illumination applications.

The fiber optic trees consist of self-supporting fiber optic cables comprised of multiple strands of optic fiber and metallic wire which is twisted along the length thereof. The twist is effective to: 1) stress the fiber cladding and cause light to escape from the fiber along the length thereof and 2) create the appearance of a branch or other aesthetic element. The optical fibers are supported by strands of wire coextensive therewith. When light is input to the fibers, an aesthetically pleasing optical sculptural image is created.

BRIEF DESCRIPTION OF THE DRAWINGS

FIG. 1 is a front view of a fiber optic tree constructed in accordance with the present teachings, showing one embodiment of the fiber optic illumination system remotely located.

FIG. 2 is a side view of a section of fiber optic cable constructed in accordance with the present teachings.

FIG. 3 is an end view of a typical section of fiber optic cable constructed in accordance with the present teachings.

FIG. 4 is a cross section of one embodiment of sculptural construction in accordance with the present teachings.

FIG. 5 is an exploded view of one embodiment of the anchoring and support assembly in accordance with the present teachings.

DESCRIPTION OF THE INVENTION

Illustrative embodiments and exemplary applications will now be described with reference to the accompanying drawings to disclose the advantageous teachings of the present invention.

FIG. 1 is a front view of a fiber optic tree 10 constructed from multiple cables 11 in accordance with the present teachings. The dark lines represent portions of the strands of wire 14 which provide structural support to the coextensive optical fibers 12.

FIG. 2 is a side view of a section of fiber optic cable 11 constructed in accordance with the present teachings. The cable 11 includes a plurality of optical fibers 12 made of acrylic or other suitable material. The fibers are coextensive with a plurality of strands of stainless steel wire 14. That is, the wires 14 are coextensive with the optical fibers along the longitudinal axes thereof.

FIG. 3 is an end view of the section of fiber optic cable constructed in accordance with the present teachings. As shown in FIG. 3, the optical fibers 12 are interspersed with the strands of stainless steel wires 14.

The wires 14 allow the cable 11 to be bent into a desired shape which is maintained by the wire until manipulated into another shape and or sculpturally broken out into single strands.

Returning to FIG. 1, a source of high intensity illumination 20 provides optical energy to the tree 10. The tree 10 is anchored in a base 16.

The method of constructing the tree 10 is as follows. First, the height of the tree to be fabricated is determined. This includes the length required for undulations in the trunk and branch structures plus the length needed for roots to dress out over the base. Then, the diameter of the wire and optic fibers are chosen. This diameter varies typically from 0.010" to 0.060'.

Next, the optical fibers are selected. The number of optical fibers required is determined by the diameter of the trunk desired and or the level of detail desired in the branch structure. In the preferred embodiment, the number of strands of wire required is twice the number of fibers required.

The wire strands are cut to the lengths determined above for the height of the tree plus undulations etc. Typically, the optical fibers are actually cut at lengths several feet longer than the wires to provide a fiber only umbilical at the end of each cable 11. This enables the fibers to be run back to the light source 20 with much more flexibility than the cable 11 would otherwise allow.

Next, the cables 11 are assembled. See FIG. 2. The top end of the wires and fibers are taped together 17 or tightly spun together with the lacing wire. The optical fibers are laced with the wire strands. The bottom end is tightly spun 18 with the lacing wire and the ends of the remaining wires are taped 19 to protect the exiting fibers from the sharp wire ends.

Next, an artificial or natural base for the tree sculpture is prepared. An anchor (FIG. 5) is fastened into the base material and extends into the sculptural area above. The anchor is typically made of ¼" to ½" thread rod. The anchor can be attached to a more elaborate rod assembly that acts as an internal skeletal support for the tree 10. The anchor/support system may be a full skeletal frame on the larger and more elaborate sculptures.

The cable 11 is then routed artistically onto and above the base 16. The cable 11 is attached to the anchor or laced about a frame (FIG. 5). This is repeated until all the cable units are in place.

As the routing process continues, the tape or tightly spun lacing wire is removed. The wires and fibers are separated from the cable and sculpted individually usually with two wires supporting each optical fiber. Weaving the one fiber with the associated two supporting wires affords sculptural control. The manipulation of the fiber and wires creates stress on the fiber cladding causing a fairly uniform light-loss through the entire length of the fiber.

The light source 20 may be disposed in the base 16 (FIG. 4) or remotely situated and connected by an umbilical as shown in FIG. 1.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A sculptural arrangement comprising:
   a flexible, self-supporting fiber optic cable consisting essentially of:
      a plurality of optical fibers substantially exposed along the length thereof and adapted to radiate optical energy along the length thereof and
      a plurality of strands of metallic wire wrapped around said plurality of optical fibers to provide support therefor,
   said cable extending generally in a first direction and having a plurality of bundles of individually supported fibers fanning-out therefrom to provide:
      a first bundle extending in said first direction,
      a second bundle extending, at least partially, in a second direction transverse to said first direction, and
      a third bundle extending, at least partially, in a third direction transverse to said first and second directions, to create a three-dimensional optical arrangement and
   means for providing illumination to said fibers.

2. The invention of claim 1 wherein said first direction is vertical.

3. The invention of claim 2 wherein said sculptural arrangement is in the shape of a tree, said cable providing the trunk thereof and said first, second and third bundles providing the branches and limbs thereof.

4. A method of fabricating a fiber optic sculptural art including the steps of:
   twisting lengths of optical fiber with lengths of wire to form a flexible self-supporting cable;
   bending the cable into a desired shape;
   separating the optical fibers and wires into smaller groupings; and
   inputting optical energy into said optical fibers.

5. A flexible, self-supporting fiber optic cable consisting essentially of:
   a plurality of optical fibers substantially exposed along the length thereof and adapted to radiate optical energy radially along the length thereof and
   a plurality of strands of metallic wire wrapped around said plurality of optical fibers to provide support therefor.

* * * * *